United States Patent
Dimino, Jr. et al.

(10) Patent No.: US 10,755,729 B2
(45) Date of Patent: Aug. 25, 2020

(54) SYSTEMS AND METHODS FOR INTERRELATING TEXT TRANSCRIPT INFORMATION WITH VIDEO AND/OR AUDIO INFORMATION

(71) Applicant: Axon Enterprise, Inc., Scottsdale, AZ (US)

(72) Inventors: Joseph Charles Dimino, Jr., Seattle, WA (US); Sayce William Falk, Seattle, WA (US); Leo Thomas Rossignac-Milon, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 15/677,399

(22) Filed: Aug. 15, 2017

(65) Prior Publication Data
US 2018/0130483 A1    May 10, 2018

Related U.S. Application Data

(60) Provisional application No. 62/418,613, filed on Nov. 7, 2016.

(51) Int. Cl.
*G10L 15/26* (2006.01)
*G10L 21/055* (2013.01)
(Continued)

(52) U.S. Cl.
CPC .......... *G10L 21/055* (2013.01); *G10L 15/08* (2013.01); *G10L 15/26* (2013.01); *G10L 15/265* (2013.01);
(Continued)

(58) Field of Classification Search
CPC ..... G10L 15/265; G10L 15/08; G10L 15/187; G10L 15/22; G10L 15/063; G10L 15/20; G10L 13/08; G06F 17/289
See application file for complete search history.

(56) References Cited

U.S. PATENT DOCUMENTS 5,649,060 A     7/1997  Ellozy et al.
6,144,938 A *  11/2000  Surace ................. G10L 13/033
                                                        704/257

(Continued)

FOREIGN PATENT DOCUMENTS

JP       2009088990 A    4/2009
KR    1020080084303 A    9/2008

OTHER PUBLICATIONS

Korean Intellectual Property Office, International Search Report, dated Nov. 29, 2017, International Application No. PCT/US2017/046950.

(Continued)

*Primary Examiner* — Neeraj Sharma
(74) *Attorney, Agent, or Firm* — Letham Law Firm (57) ABSTRACT

A system or method for aligning in time a first transcript to audio data used to create the first transcript. The system or method performs the following actions. Receiving the first transcript. The first transcript includes a first plurality of words that are in the audio data. Transcribing the audio data to make a second transcript. The second transcript includes a second plurality of words that are in the audio data and a respective time of a location in the audio data of each word of the second plurality. For each word of the second plurality found in the first plurality, assigning the respective time of the location of the word of the second plurality to the word of the first plurality thereby aligning in time the first transcript to the audio data.

20 Claims, 4 Drawing Sheets

(51) Int. Cl.
    *H04N 21/242* (2011.01)
    *H04N 21/43* (2011.01)
    *H04N 21/4223* (2011.01)
    *H04N 21/8547* (2011.01)
    *H04N 21/2343* (2011.01)
    *G10L 21/10* (2013.01)
    *G10L 25/51* (2013.01)
    *H04N 5/04* (2006.01)
    *G10L 15/08* (2006.01)

(52) U.S. Cl.
    CPC .............. *G10L 21/10* (2013.01); *G10L 25/51* (2013.01); *H04N 5/04* (2013.01); *H04N 21/234336* (2013.01); *H04N 21/242* (2013.01); *H04N 21/4223* (2013.01); *H04N 21/4307* (2013.01); *H04N 21/8547* (2013.01); *G10L 2015/088* (2013.01)

(56) References Cited

U.S. PATENT DOCUMENTS

| | | | |
|---|---|---|---|
| 6,263,308 B1* | 7/2001 | Heckerman | G10L 15/063 704/231 |
| 6,505,153 B1 | 1/2003 | Van Thong et al. | |
| 6,757,362 B1* | 6/2004 | Cooper | H04M 3/527 379/88.01 |
| 7,668,710 B2* | 2/2010 | Doyle | G10L 15/01 704/231 |
| 7,966,187 B1* | 6/2011 | Pettay | G10L 15/26 704/270 |
| 8,131,545 B1* | 3/2012 | Moreno | G10L 15/04 704/235 |
| 8,560,297 B2* | 10/2013 | Quirk | G06F 17/2827 382/229 |
| 8,564,721 B1 | 10/2013 | Berry et al. | |
| 8,572,488 B2* | 10/2013 | Phillips | G06F 3/0482 715/716 |
| 8,612,205 B2* | 12/2013 | Hanneman | G06F 17/2827 704/2 |
| 8,645,134 B1* | 2/2014 | Harrenstien | G10L 15/26 704/235 |
| 9,189,514 B1 | 11/2015 | Myslinski | |
| 9,202,469 B1 | 12/2015 | Moorjani et al. | |
| 9,536,517 B2* | 1/2017 | Williams | G10L 15/063 |
| 9,558,740 B1 | 1/2017 | Mairesse et al. | |
| 9,799,336 B2* | 10/2017 | Dzik | G10L 15/26 |
| 9,852,743 B2* | 12/2017 | Zhang | G10L 21/013 |
| 9,900,632 B1 | 2/2018 | Flores Guerra | |
| 9,905,221 B2* | 2/2018 | Nir | G06F 17/30746 |
| 10,546,588 B2 | 1/2020 | Kofman | |
| 2002/0010916 A1 | 1/2002 | Thong | |
| 2002/0138265 A1* | 9/2002 | Stevens | G10L 15/22 704/251 |
| 2003/0086409 A1 | 5/2003 | Karas et al. | |
| 2003/0105630 A1* | 6/2003 | MacGinitie | G10L 15/01 704/235 |
| 2005/0033582 A1* | 2/2005 | Gadd | G06Q 30/02 704/277 |
| 2005/0046755 A1* | 3/2005 | Hattori | B60R 11/0211 348/837 |
| 2005/0131709 A1* | 6/2005 | Creamer | G10L 19/018 704/277 |
| 2005/0132420 A1 | 6/2005 | Howard | |
| 2005/0137867 A1* | 6/2005 | Miller | G10L 15/26 704/252 |
| 2006/0041427 A1* | 2/2006 | Yegnanarayanan | G10L 15/063 704/235 |
| 2006/0074656 A1* | 4/2006 | Mathias | G10L 15/063 704/243 |
| 2006/0182238 A1* | 8/2006 | Groeger | G10L 21/00 379/88.17 |
| 2006/0215636 A1 | 9/2006 | Corley et al. | |
| 2007/0011012 A1 | 1/2007 | Yurick | |
| 2007/0033032 A1 | 2/2007 | Schubert et al. | |
| 2007/0244700 A1 | 10/2007 | Kahn et al. | |
| 2007/0250316 A1* | 10/2007 | Ramaswamy | G10L 15/18 704/235 |
| 2008/0177536 A1 | 7/2008 | Sherwani | |
| 2008/0255837 A1* | 10/2008 | Kahn | G10L 25/48 704/235 |
| 2009/0319265 A1* | 12/2009 | Wittenstein | G10L 21/04 704/234 |
| 2010/0250250 A1* | 9/2010 | Wiggs | G10L 15/32 704/235 |
| 2010/0332225 A1* | 12/2010 | Arrowood | G10L 15/26 704/235 |
| 2011/0054901 A1 | 3/2011 | Qin | |
| 2012/0016671 A1 | 1/2012 | Jaggi et al. | |
| 2012/0143606 A1* | 6/2012 | Pham | G10L 15/26 704/235 |
| 2012/0191457 A1* | 7/2012 | Minnis | G10L 13/10 704/260 |
| 2013/0060572 A1* | 3/2013 | Garland | G11B 27/10 704/254 |
| 2013/0120654 A1 | 5/2013 | Kuspa | |
| 2013/0283401 A1 | 10/2013 | Pabla | |
| 2014/0039887 A1* | 2/2014 | Dzik | G10L 15/26 704/235 |
| 2014/0040713 A1 | 2/2014 | Dzik et al. | |
| 2014/0047073 A1* | 2/2014 | Beme | H04L 65/601 709/219 |
| 2015/0055013 A1 | 2/2015 | Kwon et al. | |
| 2015/0067456 A1 | 3/2015 | Kashibuchi | |
| 2015/0067459 A1* | 3/2015 | Lester | G06F 17/241 715/203 |
| 2015/0127347 A1* | 5/2015 | Tjalve | G10L 15/19 704/257 |
| 2015/0255066 A1* | 9/2015 | Wilder | G06K 9/00744 704/235 |
| 2015/0293996 A1 | 10/2015 | Liu | |
| 2016/0019202 A1 | 1/2016 | Adams et al. | |
| 2016/0140965 A1 | 5/2016 | Kumar | |
| 2016/0277577 A1* | 9/2016 | Yentis | G06Q 10/063 |
| 2016/0293160 A1* | 10/2016 | Nir | G06F 17/30746 |
| 2017/0024490 A1 | 1/2017 | Lau | |
| 2017/0062010 A1* | 3/2017 | Pappu | G10L 15/265 |
| 2017/0092262 A1* | 3/2017 | Pinhasi | G10L 15/02 |
| 2017/0148464 A1* | 5/2017 | Zhang | G10L 21/013 |
| 2017/0337913 A1* | 11/2017 | Guegan | G10H 1/361 |
| 2018/0034961 A1* | 2/2018 | Engelke | G10L 15/265 |
| 2018/0053510 A1* | 2/2018 | Kofman | G11B 27/031 |
| 2018/0075844 A1* | 3/2018 | Kim | G10L 15/144 |
| 2018/0270350 A1 | 9/2018 | Engelke | |
| 2018/0307462 A1 | 10/2018 | Choi | |
| 2018/0322106 A1 | 11/2018 | Roks | |
| 2019/0245972 A1 | 8/2019 | Dwyer | |
| 2020/0126561 A1 | 4/2020 | Kofman | |

OTHER PUBLICATIONS

USPTO, Non-Final Office Action for U.S. Appl. No. 16/289,058 dated May 6, 2020.

\* cited by examiner

SYSTEMS AND METHODS FOR INTERRELATING TEXT TRANSCRIPT INFORMATION WITH VIDEO AND/OR AUDIO INFORMATION

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Body cameras, in-car cameras, wireless microphones, and smart phones have increased the amount of recorded audiovisual information. As used herein, "audiovisual" information, data, or recordings refers to video that includes audio, video that is associated with separate audio of the video scene, or audio alone. The internet, with such sites as youtube.com, has provided an avenue for posting audiovisual recordings for public viewing. Security agencies (e.g., police forces) not only capture audiovisual recordings, but at times release audiovisual recordings or a portion of an audiovisual recording to the public for viewing. A security agency may also prepare and release an audiovisual recording as evidence for use in a proceeding.

A security agency may release not only an audiovisual recording, but also a written record (e.g., transcript) of the audio portion of the recording. Audio portions of an audiovisual recording may be transcribed in a traditional manner (e.g., by a court reporter, by a transcriptionist) or by a computer (e.g., computer-generated transcription). A transcript includes a written representation of content in the audio portion (e.g., audio data) of the audiovisual recording. Presently, traditional transcripts are generally more accurate than computer-generated transcripts. Traditional transcripts are generally more accurate as to the semantic translation of sounds into proper words for a particular language.

However, a computer-generated transcript may include a record of the location (e.g., time, position) in the audiovisual data where each word or sound was detected. Traditional prepared transcripts generally do not include additional data that provides the location of each word or sound of the transcript in the audiovisual recording.

According to various aspects of the present disclosure, traditional transcripts may be used to provide accurate semantics and computer-generated transcripts may be used to locate the words of the audio data to the location in the audiovisual recording where the words occur. Traditional transcripts may be used in combination with computer-generated transcripts so that the words of the traditional transcript may be linked (e.g., tied, associated, aligned) to the location in the audiovisual recording where the word occurs.

Tying the traditional transcript to the timing of the audiovisual recording enables real-time redaction of portions of the audiovisual data on playback of the recording. Redaction may be performed automatically, with little or no human intervention. Rules may be specified as to the type of material that should be redacted from an audiovisual recording. During a presentation of audiovisual data, if the rules specify that words or sounds in the transcript should be redacted, the presentation may be altered to redact the portion of the audiovisual data that falls within the rules of redaction.

Further, a transcript in electronic form, whether traditionally or computer-generated, enables a user to search the transcript for particular words such as geographic locations, articles of clothing, weapons, buildings, or other objects. The link to the location of words in the audiovisual data permits a user to search the transcript and find the location in the audiovisual data easily.

A transcript may include a description of the characteristics the sounds or words of the audio. A description may include the volume (e.g., intensity), tone (e.g., menacing, threatening, helpful, kind), frequency range, or emptions (e.g., anger, elation) of a word or a sound. The description of the audio data may be searched by a user and linked to a location in the audiovisual data.

Figure 1:
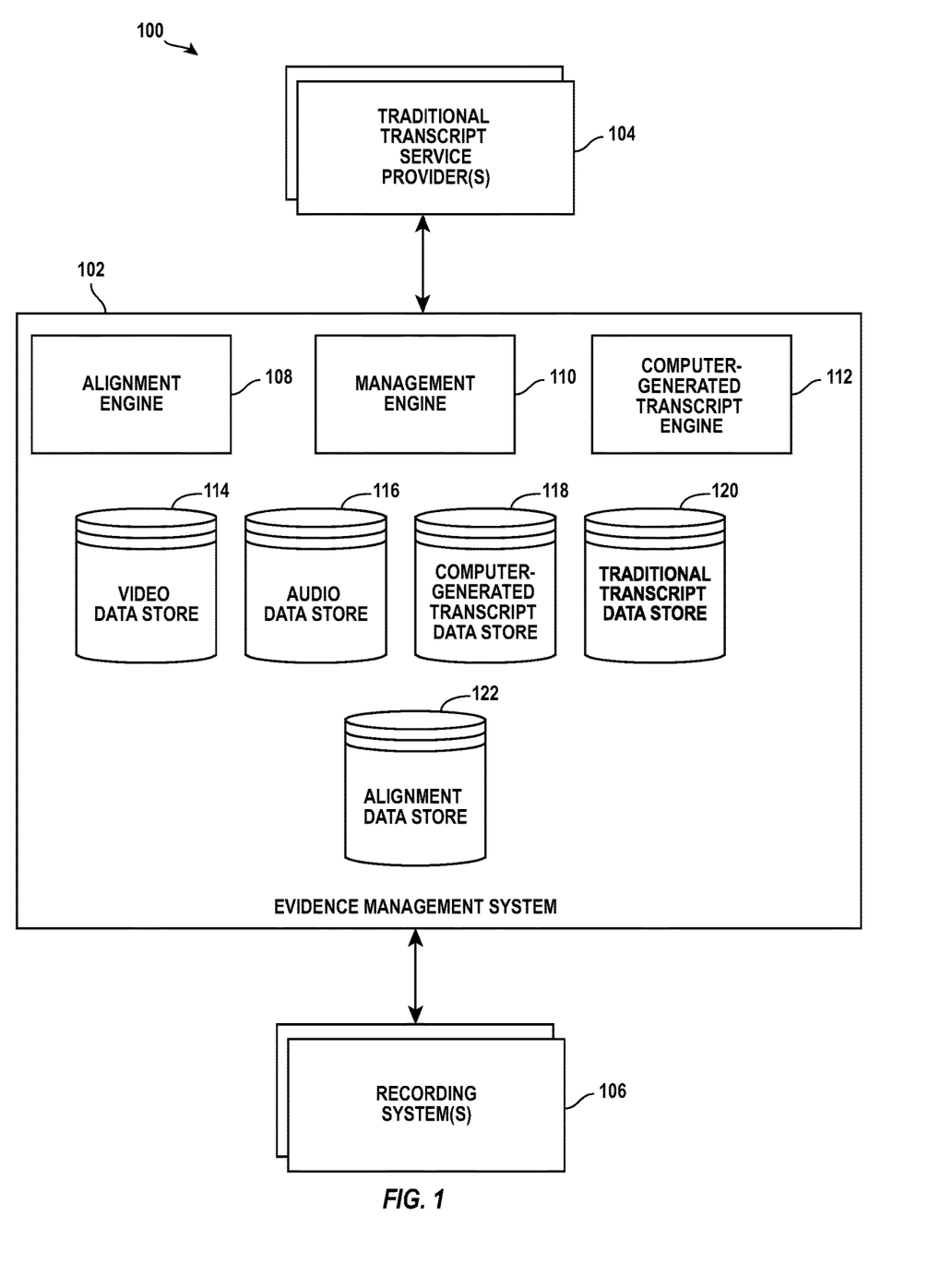
FIG. 1 is a block diagram that illustrates an example embodiment of a system for interrelating text transcript information with video and/or audio information according to various aspects of the present disclosure.

System 100 of FIG. 1 is an example environment for ordering the creation of transcripts, storing transcripts, generating transcripts, storing audiovisual data, aligning the words of a transcript and/or description of the audio data to locations in audiovisual data, manipulating (e.g. redacting, searching) the audiovisual data using an aligned transcript, generating presentations of the aligned transcript and the audiovisual data, and using an aligned transcript to redact a presentation of an audiovisual recording in accordance with rules that specify material that should be redacted.

System 100 may include one or more traditional transcript service providers 104, evidence management system 102, and one or more recording systems 106.

A recording system detects physical properties in an environment and records (e.g., stores) the information (e.g., data) regarding the physical properties. Recorded information may be analyzed to determine characteristics of the physical properties detected and recorded.

Recorded information may relate to an incident (e.g., event, occurrence). Recorded information may provide a record of an incident. Recorded information may be reviewed to provide a reminder of the incident. Recorded information may be used as evidence to prove the occurrence of an incident.

A recording system may detect and record visual (e.g., video) data and/or audible (e.g., audio) physical properties. Visual and/or audible physical properties detected and recorded may be within the range of vision and/or hearing of a human. Visual and/or audible physical properties detected and recorded may outside the range of vision and/or hearing of a human. The capture and storing of video and/or audio data may be accomplished using any suitable technique. Use of the term video data may refer to both video and audio data together.

A recording system may create an audiovisual record. Data stored by a recording system may be stored in any suitable format, including but not limited to H.264, MPEG-4, AAC, and WAV. A recording system may convert the recorded information from one format (e.g., analog data, encoding) to another format (e.g., digital data, encoding).

A recording system may communicate (e.g., transmit, receive) data. A recording system may transmit recorded data to another system. A recording system may include any conventional communication circuitry for transmitting and/or receiving data. A recording system may use any conventional wired (e.g., LAN, Ethernet) or wireless communication (e.g., Bluetooth, Bluetooth Low Energy, WiFi, ZigBee, 2G, 3G, 4G, WiMax) protocol. A recording system may store audiovisual data for a period (e.g., shift, day) then transmit the audiovisual data to another system. A recording system may transmit audiovisual information to another system as it is captured (e.g., live streaming).

Recording system 106 performs the functions of recording system discussed herein. In some embodiments, recording system 106 may include a digital camera such as a wearable (e.g., body-worn, carried) camera that records audiovisual data. In some embodiments, recording system 106 includes an in-car camera or dash cam that records audiovisual data. Recording system 106 may include separate recording systems, such as a digital camera and a wireless microphone that cooperate to perform the functions of a recording system. For example, video data from a first camera and audio data from a second camera may be combined and/or used. The act (e.g., function, operation) of recording may use any suitable technique known to one of ordinary skill in the art, and so is not described in further detail herein.

In some implementations, recording system 106 records audiovisual information then transmits data to evidence management system 102. In some implementations, recording system 106, recording system 106 live streams audiovisual data to evidence management system 102.

An evidence management system may collect and manage information. An evidence management system may receive recorded data from one or more recording systems. An evidence management system may receive transcripts from one or more traditional transcript service providers. An evidence management system may provide recorded data, transcript data, and/or data that has been processed to a person or entity. An evidence management system may communicate with other systems to transmit and receive data. An evidence management system may include any conventional communication circuitry for transmitting and/or receiving data. An evidence management system may use any conventional wired or wireless communication protocol for communicating data.

An evidence management system may store data. An evidence management system may store recorded data, the traditional transcripts, computer-generated transcripts, and/or alignment data that associates recorded data to transcript data. Recoded data includes audiovisual data. An evidence management system may store and/or manage data in such a manner that it may be used as evidence in a proceeding, such as a legal proceeding.

An evidence management system may organize stored data according to the recording system that captured the data. An evidence management system may organize stored data according to a particular recorded data (e.g., video). An evidence management system may further organize stored data according to agencies (e.g., groups, organizations). An evidence management system may group captured data for storage according to the agency to which the person using the recording system used to capture the data is employed.

Evidence management system 102 is an example of an embodiment of an evidence management system. Evidence management system 102 performs the functions of an evidence management system discussed herein.

Evidence management system 102 may include alignment engine 108, management engine 110, computer-generated transcript engine 112, video data store 114, audio data store 116, computer-generated transcript data store 118, traditional transcript data store 120, and alignment data store 122.

An evidence management system may perform one or more operations (e.g., functions). An operation may include providing recorded data to a traditional transcript service provider, such as to traditional transcript service provider 104, associating transcripts to recorded data, aligning traditional transcripts to recorded data, generating a computer-generated transcript of recorded data, and/or providing data to another system. An engine may perform one or more operations of an evidence management system. An engine may perform one or more functions or a single function. An engine may access stored data to perform a function. An engine may generate data for storage.

The term "engine" as used herein refers to, in general, circuitry, logic embodied in hardware and/or software instructions executable by a processor of a computing device. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA™, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

The devices and systems illustrated herein may include one or more computing devices configured to perform the functions of the illustrated engines, though the computing devices themselves have not been illustrated in every case for the sake of clarity.

A computer-generated transcript engine generates a computer-generated transcript. A computer-generated transcript engine may receive audio data, analyze the audio data to identify words of one or more languages, and provide a record of the words identified for storage. A computer-generated transcript engine may include sophisticated algorithms to perform semantic analysis. Semantic analysis may include recognizing the different connotations (e.g., meanings) of words to correctly identify words used in human speech. Semantic analysis may include identifying words and phrases used in the vernacular (e.g., region idioms, gang-related speech) and providing a translated meaning.

For example, computer-generated transcript engine 112 may use any suitable speech-to-text algorithms to produce the computer-generated transcript, including but not limited acoustic modeling, language modeling, Hidden Markov models, feedforward artificial neural networks, and recurrent neural networks.

A computer-generated transcript engine may identify the location of words and phrases in the audio data. A timestamp in the computer-generated transcript may indicate a point in time (e.g., location) at which a given recognized word occurred in the audio data. A timestamp may have any suitable format including a time of day, an elapsed time from the beginning of the recording, and an elapsed time from the previously recognized word. A computer-generated transcript engine may record the location of each word and/or phrase identified in the audio data. A computer-generated transcript engine may prepare data that relates (e.g., associates) each word or phrase to its respective location in the audio data. A computer-generated transcript engine may use data that relates the audio data to the video data to relate the location of words and/or phrases to a location in the video data. The data that describes the location of a word and/or a phrase to a location in audiovisual data may be referred to as alignment data. A computer-generated transcript engine may store alignment data. Alignment data may be stored in alignment data store 122 and/or in computer-generated transcript data store 118. Alignment data may be stored with the computer-generated transcript in a single file or separately with information as to how the alignment data relates to the computer-generated transcript.

Because wearable cameras and other types of recording devices in the field may be subject to poor audio quality, including but not limited to having large amounts of noise, having inarticulate speech, having radio chatter or other background noise, computer-generated transcription of audiovisual data may generate inconsistent results. Confidence scores may be associated with words within the computer-generated transcript to indicate the estimated likelihood that the word generated by the computer-generated transcript engine is an accurate transcription of the word in the audio data.

A management engine may manage the generation and storage of transcripts. A management engine may receive instructions from a user and/or other engines. A management engine may perform a function responsive to an instruction. A management engine may order the generation of a transcript by a traditional transcript service provider, such as traditional transcript service providers 104, or by a computer-generated transcript engine, such as computer-generated transcript engine 112 engine. A management engine may provide audiovisual data to a traditional transcript service provider and/or a computer-generated transcript engine. A management engine may use any conventional communication protocol to transmit audiovisual information. A management engine may track the progress of transcript generation.

A management engine may receive a transcript. A management engine may use any conventional communication protocol to receive a transcript. A management engine may store a transcript. A management engine may associate a transcript with an audiovisual data. A management engine may associate a computer-generated transcript to a traditional transcript.

A management engine may receive alignment data. A management engine may store alignment data. A management engine may associate alignment data with audiovisual data. A management engine may associate alignment data to a computer-generated transcript and/or a traditional transcript.

A management engine may associate stored data to one or more recording systems, such as recording systems 106. A management engine may associate stored data to the recording system that recorded an audio data that was used to generate a transcript. A management engine may associate stored data, transcripts, and/or alignment data to an agency.

A management engine may provide reports regarding the functions it has or will perform.

Management engine 110 performs the functions of a management engine discussed herein.

For example, management engine 110 may provide audio data to one or more traditional transcript service providers 104 to have the audio data transcribed. Management engine 110 may receive traditional transcripts back from the traditional transcript service providers 104. Management engine 110 may store traditional transcripts in traditional transcript data store 120.

Management engine 110 may provide a platform for agencies that store information in evidence management system 102 to manage purchase of transcription services from traditional transcript service providers 104 through the evidence management system 102. An agency may enter into contracts with one or more traditional transcript service providers 104. The agency contract may include various terms including service level agreements and price points. Management engine 110 may create accounts for traditional transcript service providers 104 within the evidence management system 102 to allow the agency to request transcripts from the traditional transcript service providers 104 according to their agency contracts.

A user (e.g., officer) associated with an agency may choose from traditional transcript service providers 104 that have a contract with the agency. Management engine 110 may provide audio data to a traditional transcript service provider 104 in response to a request from a user. Management engine 110 may seek approval from a supervisor of the user before requesting a transcript from the traditional transcript service provider 104. The management engine 110 may wait for the approval of the supervisor before it sends out audio data to the traditional transcript service provider 104.

Management engine 110 may create a unique identifier for each transcription order. Evidence management system 102 may provide the unique identifier to the requesting agency to allow them to obtain customer service directly from traditional transcript service provider 104. Traditional transcript service provider 104 may use information obtained from the evidence management system 102, such as the unique identifier, supervisor name, and user name, to bill the agency directly for transcription services.

Management engine 110, as opposed to a user at an agency, may select a traditional transcript service provider 104, or management engine 110 may be instructed on which traditional transcript service provider 104 to use. Management engine 110 may select traditional transcript service provider 104 using any algorithm (e.g., round-robin) or using any criteria (e.g., cost, throughput, loading at provider, highest accuracy).

A traditional transcript service provider 104 may be capable of producing a highly accurate transcript of audio data. In some embodiments, audio data only or the entire audiovisual data may be transmitted to a computing device (e.g., computer) of a traditional transcript service provider 104. Traditional transcript service provider 104 may use one or more computing devices and/or mechanical devices to allow an operator (e.g., a person trained to provide transcription services) to listen to the audio data and enter a transcription of speech and/or other audio elements within the audio data. In some embodiments, evidence management system 102 may stream audio data to a computing device of an operator, and may provide a web-based interface, an app, a desktop application, or an application programming interface (API) for the operator to enter the transcription. Further description of examples of the interaction between the evidence management system 102 and the traditional transcript service providers 104 is provided below.

Management engine 110 may transcode the audio data into a format desired by a given transcription service provider 104, such as WAV. Management engine 110 may include additional metadata along with the audio data, including but not limited to an owning user, an owning agency, and/or a desired type of transcript (e.g., verbatim or standard).

A traditional transcript from the traditional transcript service provider 104 may be provided in any suitable format including but not limited to a text file and a word processing document. A traditional transcript may include explanatory information including but not limited to the identity of the speakers, a description of noises and/or sounds, and/or the meaning of colloquial language or slang.

Management engine 110 may also manage (e.g., control) a process (e.g., work flow) for making revisions to the traditional transcript. For example, as a prosecution team and a defense team argue over the exact words that should appear in a given transcript, management engine 110 may track changes made to the transcript, the identity of the person making the change, and any information as to the reason for the change. In another example, a judge may order certain portions of the transcript stricken. Management engine 110 may make and track such changes to the traditional transcript when instructed to do so.

An alignment engine aligns data. An alignment engine may identify where particular data in one set of data (e.g., file) corresponds to particular data in another file. An alignment engine may record how the data of one file aligns with the data of another file. An alignment engine may include data from one or more of the files in the file that stores alignment data.

An alignment engine may align the words and/or phrases of a traditional transcript to some or all of the words or phrases of a computer-generated transcript. Using the alignment data for the alignment between the traditional transcript and the computer-generated transcript, an alignment engine may align the traditional transcript to some or all of the identified locations in the audio file. An alignment engine may use confidence scores provided by computer-generated transcript engine 112 to aid in alignment. Using the alignment information between the audio data and the video data, an alignment engine may align the traditional transcript to video data. The data from one or more of the above alignments may be referred to as enhanced alignment data.

Due to the present quality of computer-generated transcripts, not all of the words in a computer-generated transcript are likely to be intelligible or recognizable as words of a known language. Depending on the quality of the audio data, an operator transcribing audio data may not be able to recognize all of the words spoken. Accordingly, an alignment engine may not be able to align all of the words in the traditional transcript to words in the computer-generated transcript. An alignment engine may use any algorithm for spacing words in the traditional transcript that do not match words in the computer-generated transcript.

For example, alignment engine 108 compares the words in the traditional transcript to the words in the computer-generated transcript to find matches. Alignment engine 108 may compare the words of the traditional transcript to only those words in the computer-generated transcript having a confidence score greater than a threshold. Alignment engine 108 may compare single words from the traditional transcript to words of the computer-generated transcript to find a match. Alignment engine 108 may compare characters from the words of the traditional transcripts to the characters of the words of the computer-generated transcript to find a match. Alignment engine 108 may compare character by character the words of the traditional transcripts to the words of the computer-generated transcript to find a match. Alignment engine 108 may require that a group of words (e.g., sequence) from the traditional transcript match the same group of words in the same order before identifying the words as matching.

Alignment engine 108 may space unmatched words equally between the matched words. Alignment engine 108 may compare the intensity (e.g., volume) of the audio data to words that commonly spoken loudly or try to identify the sounds of individual letters or syllables in the words of the transcript to letter or syllable sounds in the audio data to identify a location of unmatched words.

As understood by one of ordinary skill in the art, a "data store" as described herein may be any suitable device configured to store data for access by a computing device. A data store receives data. A data store retains (e.g., stores) data. A data store retrieves data. A data store provides data for use by a system, such as an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in computer-readable medium.

One example of a data store suitable for use with the high capacity needs of the evidence management system 102 is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

Data stores 114-122 perform the functions of a data store discussed herein. A data store may be implemented using any computer-readable medium. An engine (e.g., 108-112) or computing device of evidence management system 102 may access data store 114-122 locally (e.g., via data bus), over a network, and/or as a cloud-based service.

In an example of a data store suitable for use with recording systems 106, which includes reliable storage but also low overhead, is a file system or database management system that stores data in files (or records) on a computer-readable medium such as flash memory, random access memory (RAM), or hard disk drives.

One of ordinary skill in the art will recognize that separate data stores described herein may be combined into a single data store, and/or a single data store described herein may be separated into multiple data stores, without departing from the scope of the present disclosure.

A computer-readable medium may store, retrieve, and/or organize data. As used herein, the term "computer-readable medium" includes any storage medium that is readable by a machine (e.g., computer, processor, processing circuit). Storage medium includes any devices, materials, and/or structures used to place, keep, and retrieve data (e.g., information). A storage medium may be volatile or non-volatile. A storage medium may include any semiconductor (e.g., RAM, ROM, EPROM, Flash), magnetic (e.g., hard disk drive), optical technology (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data.

Figure 2:
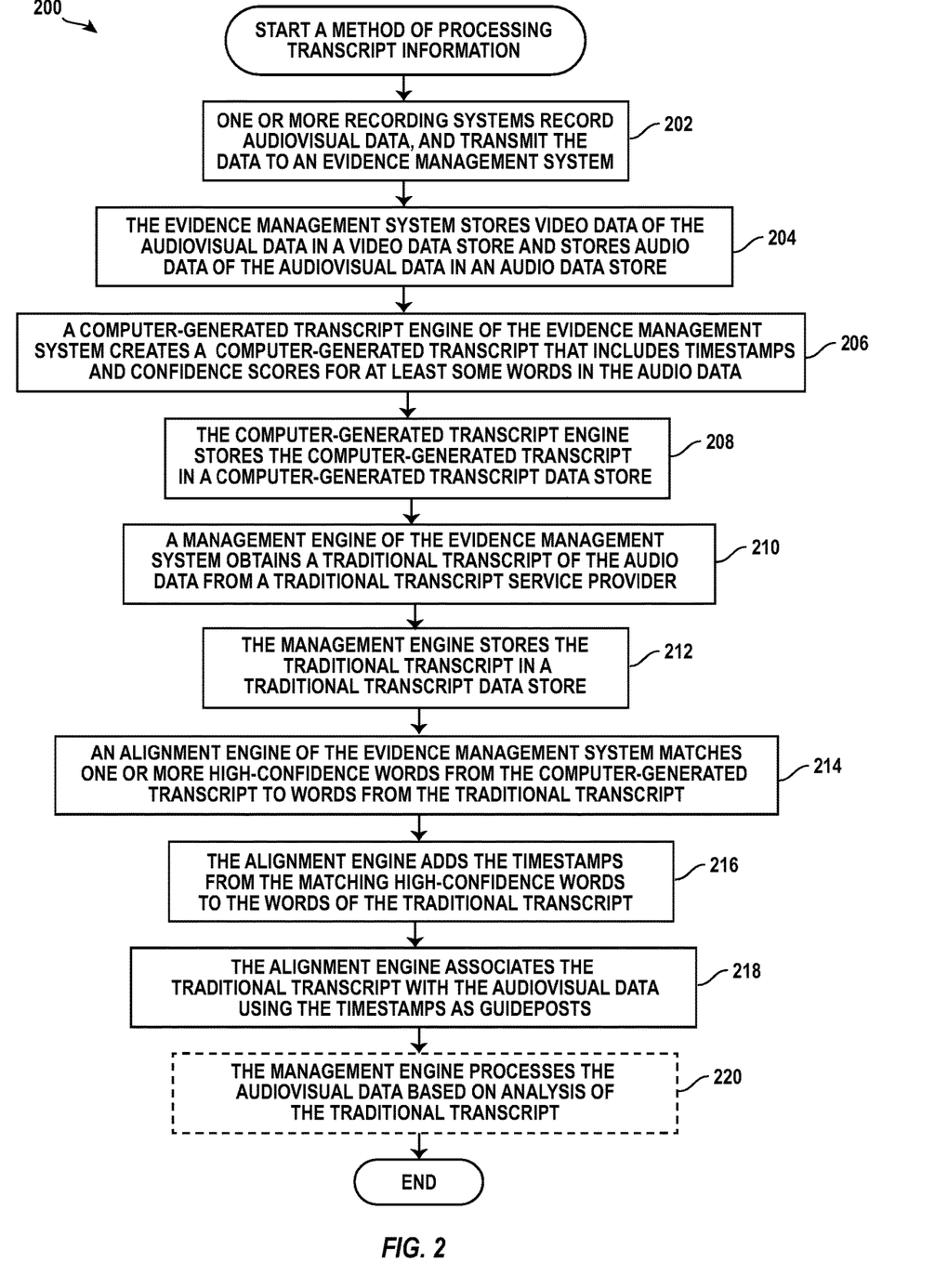
FIG. 2 is a flowchart that illustrates an example embodiment of a method of processing video transcription information according to various aspects of the present disclosure.

FIG. 2 is a flowchart that illustrates an example embodiment of a method of processing video transcript information according to various aspects of the present disclosure.

From a start block, the method 200 proceeds to block 202, where one or more recording systems 106 record audiovisual data, and transmit the data to an evidence management system 102. In some embodiments, the recording systems 106 may be capable of wireless communication, and may transmit recorded data to the evidence management system 102 using any suitable transmission technology including but not limited to WiFi, 3G, 4G, LTE, and WiMAX. In some embodiments, the recording systems 106 may be physically connected to a dock via any suitable type of wired connection including but not limited to USB, FireWire, and a 3.5 mm connector. The dock may then obtain the recorded data from the recording system 106 and then transmit the recorded data to the evidence management system 102 via a network. Further description of devices and techniques for transmitting recorded data to an evidence management system 102 from a recording system 106 are described in commonly owned, co-pending U.S. patent application Ser. No. 15/210,060, filed Jul. 14, 2016, the entire disclosure of which is hereby incorporated by reference herein for all purposes.

At block 204, the evidence management system 102 stores the video data (if any) of the audiovisual data in a video data store 114 and stores the audio data of the audiovisual data in an audio data store 116. In some embodiments, the video data and the audio data may be stored together. In some embodiments, the video data and audio data may be stored in separate data stores in order to allow the audio data alone to be transmitted to a traditional transcript service provider 104, so the video data and audio data may be associated with each other by a unique identifier or using another suitable technique.

Next, at block 206, a computer-generated transcript engine 112 of the evidence management system 102 creates a computer-generated transcript that includes timestamps and confidence scores for at least some words in the audio data, and at block 208, the machine transcription engine 112 stores the computer-generated transcript in a computer-generated transcript data store 118. In some embodiments, the computer-generated transcript is stored in a machine-readable format, including but not limited to JavaScript Object Notation ("JSON") and extensible markup language ("XML"). In some embodiments, all audio data may be transcribed by the computer-generated transcript engine 112. In some embodiments, only audio data tagged with a given type or stored in a given category may be transcribed by the computer-generated transcript engine 112.

At block 210, a management engine 110 of the evidence management system 102 obtains a traditional transcript of the audio data from a traditional transcript service provider 104.

At block 212, the management engine 110 stores the traditional transcript in a traditional transcript data store 120.

Figure 4:
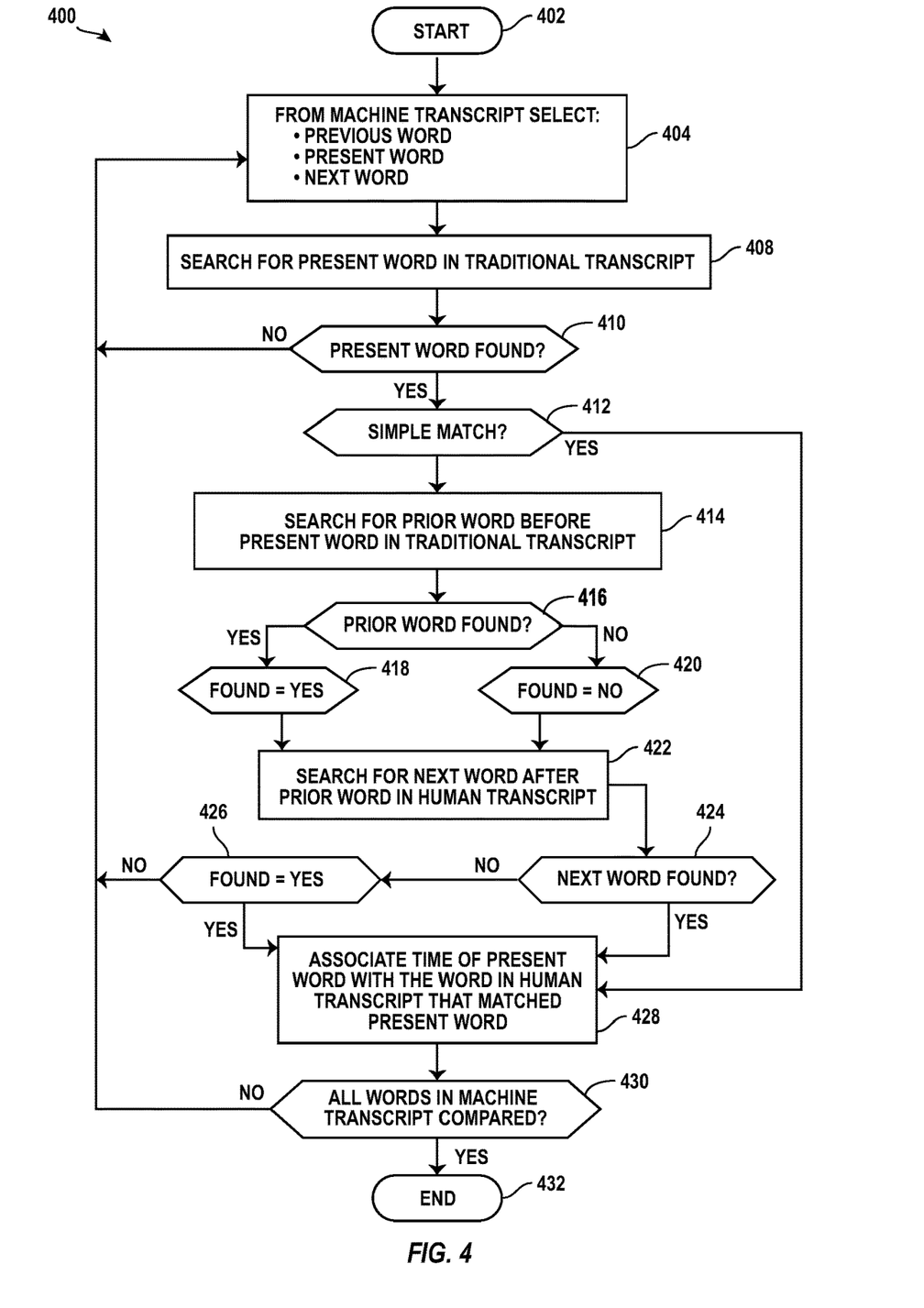
FIG. 4 is a flow chart that illustrates an example embodiment of a method for aligning a human-made transcript to the timing of a machine transcript according to various aspects of the present disclosure.

The method 200 then proceeds to block 214, where an alignment engine 108 of the evidence management system 102 matches one or more high-confidence words from the computer-generated transcript to words from the traditional transcription. An example of a method suitable for use in block 214 is illustrated in FIG. 4 and described further below.

At block 216, the alignment engine 108 adds the timestamps from the matching high-confidence words to the words of the traditional transcript. In an implementation, alignment engine 108 adds the timestamps of only those words of the machine-generated transcript whose confidence scores are greater than a threshold to the matching words of the traditional transcript. The timestamps may be added to the traditional transcript using any suitable format. In some embodiments, the traditional transcription may be reformatted into a JSON format, an XML format, or another machine-readable format in order to associate the timestamps with the words. In some embodiments, a separate record of matching words, timestamps, and their location within the traditional transcript may be created. The separate record may be stored in the alignment data store 122, or may be stored along with the traditional transcript in the traditional transcript data store 120. In some embodiments, at least some of the actions described in block 216 may be performed in the method suitable for use in block 214.

At block 218, the alignment engine 108 associates the traditional transcript with the audiovisual data using the timestamps as guideposts. The association may include creating an overlay that presents the text from the traditional transcript at a pace indicated by the guidepost timestamps. Using an overlay allows the evidence management system 102 to generate an MPEG, DVD, or other video presentation format that would always present the transcript text in the same manner. The association may include creating a subtitle track and/or SRT file that presents the text from the traditional transcript at a pace indicated by the guidepost timestamps. Using a subtitle track allows a viewer to turn the transcript display on and off. The pace of display between the guidepost timestamps may be determined using syllables or other characteristics detected in the audio data.

At block 220, the management engine 110 processes the audiovisual data based on analysis of the traditional transcript. The actions of block 220 are optional, and either may not be performed, or may be performed separately from the rest of the method 200 once a traditional transcript has been aligned to audiovisual data.

Management engine 110 may use the aligned traditional transcript to automatically redact portions of the audiovisual data. For example, management engine 110 may detect names, addresses, profanity, and/or other keywords, or pattern-based portions of text from the aligned traditional transcript. Management engine 110 may use the associated timestamps to automatically redact the detected portions of the audiovisual data. As another example, the management engine 110 may provide a search interface that allows the full text of traditional transcripts to be searched, wherein the search results will link directly to the relevant portion of audiovisual data using the timestamps. As yet another example, the management engine 110 may present a web-based interface, an app, a desktop application, an API, or another type of interface that allows a user to select a portion of the transcript to be redacted, and the management engine 110 may automatically redact the associated portions of the audiovisual data.

The method 200 then proceeds to an end block and terminates.

FIG. 4 is a flowchart that illustrates a method according to various aspects of the present disclosure. Method 400 may be performed by one or more engines, for example a computer-generated transcript engine 112 and an alignment engine 108 of evidence management system 102, or by a computing device of evidence management system 102. Method 400 includes blocks start 402, select 404, search present 408, present found 410, simple 412, search prior 414, prior found 416, set yes 418, set no 420, search next 422, next found 424, test prior 426, associate 428, complete 430, and end 432.

Evidence management system 102 may execute one or more of the blocks of method 400 in parallel. Evidence management system 102 may begin execution of a block when it has received the data required to perform the function of the block.

Method 400 begins execution with start 402. Start 402 may initialize any variable needed to perform method 400. Start 402 may retrieve, for example from a data store, any preference information provided by a user such as whether all three words (e.g., prior, present, next) must match to associate a time or the threshold for the confidence score to determine whether a word from the traditional transcript matches the computer-generated transcript. Execution continues with select 404.

Select 404 accesses the computer-generated transcript to select three contiguous words. The meaning of the term "contiguous" depends on whether the confidence score of the words of the computer-generated transcript is considered. If the confidence score is not considered, the term "contiguous" means that there are no words between the selected words. If the confidence score is considered, the term "contiguous" means that the selected words each have a confidence score greater than the threshold and all of the words between any of the selected words, if any, have a confidence score of less than the threshold. Edge cases, such as first starting or ending method 400 are not described herein. "Prior word" refers to the first word in the sequence of three contiguous words, "present word" refers to the word that follows "prior word" and comes before "next word" in the transcript. The words "prior", "present", and "next" refer to the order of words in the order in which the words would be read in the transcript. After selecting three continuous words from the computer-generated transcript, execution moves to search present 408.

Search present 408 searches for the present word in the traditional transcript. Search present 408 uses any conventional technique for searching a digital file for a particular word. The word from the traditional transcript that matches the present word is referred to herein as the identified word. Execution moves to present found 410. Present found 410 makes a decision based on whether the search present 408 found the present word in the traditional transcript. If the present word was found, execution goes to simple 412. If the present word was not found, execution goes to select 404.

Simple 412 determines whether method 400 should make decisions based on finding present word alone in the traditional transcript or whether prior word, next word, or both must also be found in the traditional transcript in the proper order. A user or a method executed by an engine may determine whether the search performed is simple or more involved.

If only a simple search is to be performed, execution moves to associate 428. If more than one word must be found in the traditional transcript, execution moves to search prior 414.

Search prior 414 searches for the prior word in the traditional transcript. If there are no words between the prior word and the present word in the computer-generated transcript, search prior 414 may select the word that is proximate the present word in the traditional transcript; however, if the proximate word does not match the previous word, search prior 414 may need to search the traditional transcript backwards from the present word just in case the traditional transcript contains a description between the two words in the traditional transcript. If search prior must search for a march to the previous word, search prior 414 may use any conventional technique for searching a digital file for a particular word. Execution moves to prior found 416. A condition of indicating that the prior word was found may include determining that any word that matches prior word is contiguous to the word that matched present word.

Prior found 416 makes a decision based on whether the search prior 414 found the prior word in the traditional transcript. If the prior word was found, execution goes to set yes 418. If the prior word was not found or the requirement for contiguousness was not met, execution goes to set no 420.

Set yes 418 sets a variable to indicate that the prior word was found in the traditional transcript. Set no 420 sets a variable to indicate that the prior word was not found in the traditional transcript or the contiguousness requirements were not met. Execution from set yes 418 and set no 420 goes to search next 422.

Search next 422 searches for the next word in the traditional transcript. If there are no words between the prior word and the present word in the computer-generated transcript, search next 422 may select the word that is just ahead the present word in the traditional transcript. If the word from the traditional transcript does not match the next word, as discussed above, search next 422 may any conventional technique for searching a digital file for a particular word. Execution moves to next found 424. A condition of indicating that the next word was found may include determining that any word that matches next word is continuous to the word that matched present word.

Next found 424 makes a decision based on whether search next 422 found the next word in the traditional transcript. If the next word was found, at least two of the three words were found in the traditional transcript and execution goes to associate 428. If the next word was not found or the requirement for contiguousness was not met, execution goes to test prior 426.

Test prior 426 makes a decision based on whether search prior 414 found the prior word in the traditional transcript. If the prior word was found, then two of the three words were found in the traditional transcript and execution goes to associate 428.

Associate 428 associates the time that present word occurs in the audio data to the identified word in the traditional transcript.

As discussed above, when a computer-generated transcript is made, the location of each word that is recognized in the data file may be recorded. As further discussed above, the location of a word may be the time the word occurs in the audio data, the number of words or syllables before the particular word in the audio data, the time before or after a unique sound in the audio data, or any other method for determining the location of a word in the audio file.

Associate 428 associates the location, in this case time, of the present word to the identified word in the traditional transcript. In an implementation, alignment engine 108 performs associate 428 to assign the time of the present word to the identified word in the traditional transcript. In an implementation, the present word includes only those words whose confidence score is greater than a threshold. Associating may include altering the traditional transcript to include the time in a manner that it relates to the identified word or making a separate record that relates the content of the traditional transcript and the identified times.

It is possible that not all words in the traditional transcript will be associated with a time from the computer-generated transcript. The words in the traditional transcript that are not associated with a time from the computer-generated transcript may be assigned a time that is in sequential order with the associated times of the words before and after.

In complete 430, evidence management system 102 determines whether the entire computer-generated transcript has been processed. If the words of the computer-generated transcript have all been assessed and skipped or compared to words in the traditional transcript, execution goes to end 432 where the method ends. Otherwise, execution returns to select 404.

In some embodiments, other techniques may be used to determine words that match between the traditional transcript and the computer-generated transcript. For example, the same word has to be found in the traditional transcript within a given distance of an expected position of the word from the computer-generated transcript in order to be considered a match. Stated differently, if the word "dog" is determined to be a high-confidence word, and it is the $500^{th}$ word in the computer-generated transcript, a match in the traditional transcript may be the word "dog" that appears at either the $500^{th}$ word or within a predetermined number of words from the $500^{th}$ word. In some embodiments, the order or position of previously matched words may be used to further enhance the ability to find matching words. In some embodiments, the correlation between the low-confidence words and the unmatched words in the traditional transcript may be used for machine learning to improve the quality of a subsequent computer-generated transcript.

A computing device may perform a function. A computing device may provide a result of performing a function. A computing device may receive information, manipulate the received information, and provide the manipulated information. A computing device may execute a stored program to perform a function.

A computing device may provide and/or receive digital data via a conventional bus using any conventional protocol. A computing device may provide and/or receive digital data via a network connection. A computing device may store information and retrieve stored information. Information received, stored, and/or manipulated by the computing device may be used to perform a function and/or to perform a stored program.

A computing device may control the operation and/or function of other circuits and/or components of a system. A computing device may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a computing device and other circuits and/or components via any type of buss including any type of conventional data/address bus.

Figure 3:
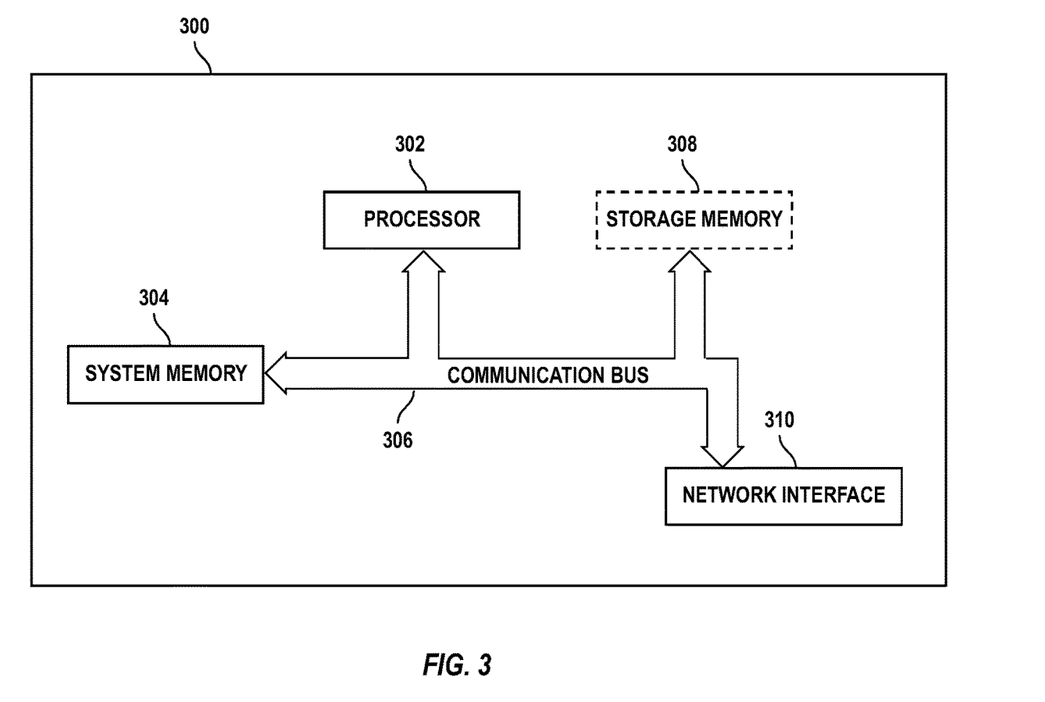
FIG. 3 is a block diagram of a computing device suitable for use to implement portions of the system according to the present disclosure.

For example, FIG. 3 is a block diagram that illustrates aspects of computing device 300 appropriate for use as a computing device of the present disclosure. Computing device 300 performs the functions of a computing device discussed above. Computing device 300 may include processor 302, system memory 304, communication bus 306, and network interface circuit 310.

While multiple different types of computing devices were discussed above, computing device 300 describes various elements that are common to many different types of computing devices. While FIG. 3 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 300 may be any one of any number of currently available or yet to be developed devices.

A processor, also referred to as a processing circuit, includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a radio, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital data.

A processing circuit may have a low power state in which only a portion of its circuits operate or it performs only certain function. A processing circuit may be switched (e.g., awoken) from a low power state to a higher power state in which more or all of its circuits operate or it performs additional certain functions.

A system memory may store data and/or program modules that are immediately accessible to and/or are currently being operated on by the processing circuit. A system memory may be a computer-readable medium. In this regard, a processor may perform or control the operation of a computing device by executing a stored program.

A communication bus transfers data between the components of a computing device. A communication bus may transfer data between computing devices. A communication bus may include a control bus, an address bus, and/or a data bus. A control bus may control access to the data and/or address bus. An address bus may specify a location of where data and/or control may be sent and/or received. Data, address, and/or control transfer via a communication bus may be unidirectional. Data, address, and/or control transfer via a communication bus may be bidirectional. Data, address, and/or control may be transferred serially and/or in parallel.

A communication bus may include any conventional control bus, address bus, and/or data bus (e.g., internal bus, expansion bus, local bus, front-side-bus, USB, FireWire, Serial ATA, AGP, PCI express, PCI, HyperTransport, Infini-Band, EISA, NuBus, MicroChannel, SBus, I2C, HIPPI, CAN bus, FutureBus). A communication bus may use any protocol, whether conventional or custom (e.g., application specific, proprietary) to transfer data.

A communication bus may transfer data, address, and/or control using any transmission medium. A transmission medium includes any material (e.g., physical) substance capable of propagating waves and/or energy (e.g., optical, electrical, electro-magnetic).

A network interface enables a computing device to communicate with other devices and/or systems over a network. The functions of a network interface may be performed by circuits, logic embedded in hardware, software instructions executable by a processor, or any combination thereof. The functions performed by a network interface enable a computing device to communicate with anther device. The functions performed by a network interface, whether using hardware or software executed by a processor, may be referred to as services. A device may request the services of a communication interface to communicate with a computing device.

A network interface may communicate via wireless medium and/or a wired medium. A network interface may include circuits, logic embedded in hardware, or software instructions executable by a processor (e.g., wireless network interface) for wireless communication. A network interface may include circuits, logic embedded in hardware, or software instructions executable by a processor (e.g., wired network interface) for wired communication. The circuits, logic embedded in hardware, or software used for a wireless network interface may be the same in whole or in part as the circuits, logic embedded in hardware, or software used for a wired network interface. A network interface may communicate using any conventional wired (e.g., LAN, Ethernet) or wireless communication (e.g., Bluetooth, Bluetooth Low Energy, WiFi, ZigBee, 2G, 3G, LTE, WiMax) protocol.

In a basic configuration, computing device 300 may include at least one processor 302 and a system memory 304 connected by communication bus 306.

Processor 302, system memory 304, and communication bus 306 may perform the functions and include the structures of a processor, a system memory, and a communication bus respectively discussed above.

Depending on the configuration of computing device 300, system memory 304 may be a volatile or nonvolatile computer-readable medium, including but not limited to read only memory ("ROM"), random access memory ("RAM"), EEPROM, and/or flash memory.

Some or all of the functions of network interface may be performed by processor 302. As will be appreciated by one of ordinary skill in the art, the network interface 310 illustrated in FIG. 3 may represent one or more wireless interfaces or physical communication interfaces described and illustrated above with respect to particular components of the system 100.

In the embodiment depicted in FIG. 3, the computing device 300 also includes a storage memory 308. However, services may be accessed using a computing device that does not include means for persisting data to a local storage memory. Therefore, the storage memory 308 depicted in FIG. 3 is represented with a dashed line to indicate that the storage memory 308 is optional. In any event, the storage memory 308 may be a computer-readable medium that may be volatile or nonvolatile, removable or nonremovable, and implemented using any technology capable of storing information including, but not limited to, a hard drive, solid state drive, CD ROM, DVD, or other disk storage, magnetic cassettes, magnetic tape, and magnetic disk storage.

Suitable implementations of computing devices that include a processor 302, system memory 304, communication bus 306, storage memory 308, and network interface circuit 310 are known and commercially available. For ease of illustration and because it is not important for an understanding of the claimed subject matter, FIG. 3 does not show some of the typical components of many computing devices. In this regard, the computing device 300 may include input devices, such as a keyboard, keypad, mouse, microphone, touch input device, touch screen, tablet, and/or the like. Such input devices may be coupled to the computing device 300 by wired or wireless connections including RF, infrared, serial, parallel, Bluetooth, Bluetooth low energy, USB, or other suitable connections protocols using wireless or physical connections. Similarly, the computing device 300 may also include output devices such as a display, speakers, printer, etc. Since these devices are well known in the art, they are not illustrated or described further herein.

In an implementation, a system for aligning comprises: a computer-generated transcript engine; an alignment engine; and a communication circuit. The communication circuit receives the first transcript, the first transcript includes a first plurality of words that are in the audio data. The computer-generated transcript engine transcribes the audio data to make a second transcript, the second transcript includes a second plurality of words that are in the audio data and a respective time of a location in the audio data of each word of the second plurality. The alignment engine, for each word of the second plurality found in the first plurality, assigns the respective time of the location of the word of the second plurality to the word of the first plurality thereby aligning in time the first transcript to the audio data. The second transcript further includes a respective number for each word, the number represents an accuracy of the transcription of the word. The alignment engine assigns the respective time of the location of only those words of the second plurality whose number is greater than a threshold.

In another implementation, a system for aligning in time a first transcript to audio data used to create the first transcript, the first transcript includes a first plurality of words that are in the audio data, the system comprising: a processing circuit and a computer-readable medium having computer-executable instructions stored thereon that, in response to execution by the processing circuit, cause the system to: transcribe the audio data to make a second transcript, the second transcript includes a second plurality of words that are in the audio data and a respective time of a location in the audio data of each word of the second plurality; compare the words of the second plurality to the words of the first plurality; and for each word of the second plurality found in the first plurality, assign the respective time of the location of the word of the second plurality to the word of the first plurality thereby aligning in time the first transcript to the audio data; wherein the second transcript further includes a respective number for each word, the number represents an accuracy of the transcription of the word; and the processing circuit compares only the words of the second plurality whose number is greater than a threshold.

While the preferred embodiment of the invention have been illustrated and described, it will be appreciated that various changes can be made therein without departing from the spirit and scope of the invention. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. In the claims, the term "provided" is used to definitively identify an object that not a claimed element of the invention but an object that performs the function of a workpiece that cooperates with the claimed invention.

The location indicators "herein", "hereunder", "above", "below", or other word that refer to a location, whether specific or general, shall be construed to refer to any location in the specification.

What is claimed is:

1. A system for aligning in time a first transcript to an audio data used to create the first transcript, the system comprising:
    a management engine;
    a transcript engine;
    an alignment engine; and
    a communication circuit; wherein:
        the management engine receives a video data via the communication circuit using wireless communication from a provided recording system, the video data including the audio data;
        responsive to receiving the video data, the management engine sends an identifier and at least one of the audio data and the video data to a traditional transcript service provider via the communication circuit;
        responsive to sending the identifier and the at least one of the audio data and the video data, the management engine receives via the communication circuit the first transcript from the traditional transcript service provider, the first transcript includes a first plurality of words, the first plurality of words transcribed from the audio data by a human operator;
        the transcript engine transcribes the audio data to make a second transcript, the second transcript includes a second plurality of words that are detected in the audio data, each word of the second plurality of words includes a respective number and a respective time, the respective number represents an accuracy of transcribing the word by the transcription engine, the respective time represents a location of the word in the audio data;
        the first transcript is a more accurate transcription of the audio data than the second transcript;
        after the management engine receives the first transcript and the transcription engine transcribes the audio data to make the second transcript, the alignment engine compares only one or more words of the second plurality of words to the first plurality of words to determine whether the one or more words of the second plurality of words match the first plurality of words, the respective number of each word of the one or more words of the second plurality of words greater than a threshold, whereby comparing only the one or more words of the second plurality of words skips one or more less accurate words of the second plurality of words of the second transcript, the respective number of each word of the one or more less accurate words less than the threshold;
        for each matching word of the one or more words of the second plurality of words that matches a same word of the first plurality of words, the alignment engine assigns the respective time of the matching word of the second plurality of words to the same word of the first plurality of words thereby aligning in time the first transcript to the audio data; and
        after alignment of the first transcript to the audio data, the management engine provides a presentation of the video data and the first plurality of words of the first transcript, the first plurality of words of the first transcript are presented at one or more respective times assigned from the second transcript during the alignment.

2. The system of claim 1 wherein each word in the first plurality of words of the first transcript that is not matches in the second transcript is assigned a time that is greater than a first respective time assigned to a previous word and less than a second respective time assigned to a subsequent word.

3. A system for aligning in time a first transcript to an audio data used to create the first transcript, the system comprising:
    a processing circuit;
    a communication circuit; and
    a computer-readable medium, the computer-readable medium storing computer-executable instructions that, in response to execution by the processing circuit, cause the system to:
        receive a video data via the communication circuit using wireless communication from a provided recording system, the video data including the audio data;
        responsive to receiving the video data, send an identifier and at least one of the audio data and the video data to a traditional transcript service provider via the communication circuit;
        responsive to sending the identifier and the at least one of the audio data and the video data, receive the first transcript via the communication circuit from the traditional transcript service provider, the first transcript includes a first plurality of words, the first plurality of words transcribed from the audio data by a human operator;
        transcribe the audio data to make a second transcript, the second transcript includes a second plurality of words that are detected in the audio data, each word of the second plurality of words includes a respective number and a respective time, the respective number represents an accuracy of transcribing the word by the system, the respective time represents a location of the word in the audio data;
        the first transcript is a more accurate transcription of the audio data than the second transcript;
        responsive to receiving the first transcript and transcribing the audio data to make the second transcript, compare one or more words of the second plurality of words to the first plurality of words to determine whether the one or more words of the second plurality of words match the first plurality of words, the respective number of each word of the one or more words of the second plurality of words greater than a threshold and whereby comparing the one or more words of the second plurality of words skips one or more less accurate words of the second plurality of words of the second transcript, the respective number of each word of the one or more less accurate words less than the threshold;

for each matching word of the one or more words of the second plurality of words determined to match a same word of the first plurality of words, assign the respective time of the matching word of the second plurality of words to the same word of the first plurality of words thereby aligning in time the first transcript to the audio data; and after alignment of the first transcript to the audio data, provide a presentation of the video data and the first plurality of words of the first transcript, the first plurality of words of the first transcript are presented at one or more respective times assigned from the second transcript during the alignment.

4. The system of claim 3 wherein each word in the first plurality of words of the first transcript that is not matched in the second transcript is assigned a time that is greater than a first respective time assigned to a previous word and less than a second respective time assigned to a subsequent word.

5. A method performed by a processing circuit for aligning in time a first transcript to an audio data used to create the first transcript, the method comprising:

receiving a video data via a communication circuit using wireless communication from a provided recording system, the video data including the audio data;

responsive to receiving the video data, sending an identifier and at least one of the audio data and the video data to a traditional transcript service provider via the communication circuit;

responsive to sending, receiving the first transcript via the communication circuit from the traditional transcript service provider, the first transcript includes a first plurality of words that are in the audio data, the first transcript transcribed from the audio data by a human operator;

transcribing by a transcription engine the audio data to make a second transcript, the second transcript includes a second plurality of words that are detected in the audio data, each word of the second plurality of words includes a respective number and a respective time, the respective number represents an accuracy of transcribing the word, the respective time represents a location of the word in the audio data, whereby the first transcript is a more accurate transcription of the audio data than the second transcript;

responsive to receiving the first transcript and transcribing the audio data to make the second transcript, comparing one or more words of the second plurality of words to the first plurality of words to determine whether the one or more words of the second plurality of words match the first plurality of words, the respective number of each word of the one or more words of the second plurality of words greater than a threshold, and whereby comparing the one or more words of the second plurality of words skips one or more less accurate words of the second plurality of words of the second transcript, the respective number of each word of the one or more less accurate words less than the threshold;

for each matching word of the one or more words of the second plurality of words that matches a same word of the first plurality of words, assigning the respective time of the matching word of the second plurality of words to the same word of the first plurality of words thereby aligning in time the first transcript to the audio data; and after aligning in time the first transcript to the audio data, providing a presentation of the video data and the first plurality of words of the first transcript, the first plurality of words of the first transcript are presented at one or more respective times assigned from the second transcript during the aligning in time of the first transcript to the audio data.

6. The method of claim 5 wherein comparing comprises a character by character comparison of the one or more words of the second plurality of words to the first plurality of words of the first transcript.

7. The system of claim 1 wherein the management engine further receives approval from a human supervisor prior to sending the identifier and the at least one of the audio data and the video data to the traditional transcript service provider.

8. The system of claim 1 wherein the traditional transcript service provider uses the identifier for invoicing an agency for preparing the first transcript.

9. The system of claim 1 wherein the management engine selects the traditional transcript service provider from a plurality of traditional transcription service providers in accordance with at least one of a cost of the traditional transcript service provider, a throughput of the traditional transcript service provider, a loading at the traditional transcript service provider, and an accuracy of the traditional transcript service provider.

10. The system of claim 1 wherein the management engine sends the identifier and the at least one of the audio data and the video data to the traditional transcript service provider responsive to a request by a user.

11. The system of claim 1 wherein:
the alignment engine compares a present word of the second plurality of words and a previous word of the second plurality of words to determine whether the one or more words of the second plurality of words match the first plurality of words;
the respective number of the present word and the respective number of the previous word are each greater than the threshold; and
the present word and the previous word are contiguous in the second plurality of words with respect to words of the second plurality of words whose respective numbers are greater than the threshold.

12. The system of claim 1 wherein:
the alignment engine compares a present word of the second plurality of words, a previous word of the second plurality of words, and a next word of the second plurality of words to determine whether the one or more words of the second plurality of words match the first plurality of words;
the respective number of the present word, the respective number of the previous word, and the respective number of the next word are each greater than the threshold; and
the previous word, the present word, and the next word are contiguous in the second plurality of words with respect to words of the second plurality of words whose respective numbers are greater than the threshold.

13. The system of claim 3 wherein the system selects the traditional transcript service provider from a plurality of traditional transcript service providers in accordance with at least one of a cost of the traditional transcript service provider, a throughput of the traditional transcript service provider, a loading at the traditional transcript service provider, and an accuracy of the traditional transcript service provider.

14. The system of claim 3 wherein the computer-executable instructions cause the system to send the identifier and the at least one of the audio data and the video data to the traditional transcript service provider responsive to a request by a user.

15. The method of claim 5 further comprising selecting the traditional transcript service provider from a plurality of traditional transcript service providers in accordance with at least one of a cost of the traditional transcript service provider, a throughput of the traditional transcript service provider, a loading at the traditional transcript service provider, and an accuracy of the traditional transcript service provider.

16. The method of claim 5 comprising sending the identifier and the at least one of the audio data and the video data to the traditional transcript service provider responsive to a request by a user.

17. The system of claim 3 wherein the computer-executable instructions further cause the system to compare a present word of the second plurality of words and a previous word of the second plurality of words to determine whether the one or more words of the second plurality of words match the first plurality of words, and wherein:
- the respective number of the present word and the respective number of the previous word are each greater than the threshold; and
- the present word and the previous word are contiguous in the second plurality of words with respect to words of the second plurality of words whose respective numbers are greater than the threshold.

18. The system of claim 3 wherein the computer-executable instructions further cause the system to compare a present word of the second plurality of words, a previous word of the second plurality of words, and a next word of the second plurality of words to determine whether the one or more words of the second plurality of words match the first plurality of words, and wherein:
- the respective number of the present word, the respective number of the previous word, and the respective number of the next word are each greater than the threshold; and
- the previous word, the present word, and the next word are contiguous in the second plurality of words with respect to words of the second plurality of words whose respective numbers are greater than the threshold.

19. The method of claim 5 further comprising comparing a present word of the second plurality of words and a previous word of the second plurality of words to determine whether the one or more words of the second plurality of words match the first plurality of words, wherein:
- the respective number of the present word and the respective number of the previous word are each greater than the threshold; and
- the present word and the previous word are contiguous in the second plurality of words with respect to words of the second plurality of words whose respective numbers are greater than the threshold.

20. The method of claim 5 further comprising comparing a present word of the second plurality of words, a previous word of the second plurality of words, and a next word of the second plurality of words to determine whether the one or more words of the second plurality of words match the first plurality of words, wherein:
- the respective number of the present word, the respective number of the previous word, and the respective number of the next word are each greater than the threshold; and
- the previous word, the present word, and the next word are contiguous in the second plurality of words with respect to words of the second plurality of words whose respective numbers are greater than the threshold.

* * * * *